United States Patent [19]

Payner et al.

[11] Patent Number: 5,200,859
[45] Date of Patent: Apr. 6, 1993

[54] VISION SAVER FOR COMPUTER MONITOR

[75] Inventors: Leonard E. Payner; Jimmy L. Keener, both of Elyria, Ohio

[73] Assignee: Ergonomic Eyecare Products, Inc., Elyria, Ohio

[21] Appl. No.: 665,754

[22] Filed: Mar. 7, 1991

Related U.S. Application Data

[63] Continuation-in-part of Ser. No. 435,047, Nov. 13, 1989, abandoned, which is a continuation of Ser. No. 191,079, May 6, 1988, Pat. No. 4,880,300.

[51] Int. Cl.$^5$ .................................................. G02B 7/18
[52] U.S. Cl. ..................................... 359/857; 359/863; 359/864; 359/865; 359/872; 359/601
[58] Field of Search ............... 359/856, 857, 858, 864, 359/865, 872, 601, 602, 859, 862, 863, 868, 869, 873; 358/238, 250, 252

[56] References Cited

U.S. PATENT DOCUMENTS

| | | |
|---|---|---|
| 2,234,227 | 3/1941 | Below et al. . |
| 2,566,830 | 9/1951 | Goldsmith . |
| 3,536,832 | 10/1970 | Zipse et al. ............................ 359/872 |
| 3,549,803 | 12/1970 | Becht et al. . |
| 3,619,040 | 11/1971 | Rickets . |
| 3,620,592 | 11/1971 | Freeman . |
| 3,697,154 | 10/1972 | Johnson . |
| 3,719,817 | 3/1973 | McCoy et al. . |
| 3,723,805 | 3/1973 | Scarpino et al. . |
| 3,738,733 | 5/1973 | Pettit . |
| 3,784,741 | 1/1974 | Minami et al. . |
| 3,820,885 | 6/1974 | Miller . |
| 3,848,974 | 11/1974 | Hosking et al. . |
| 3,914,028 | 10/1975 | Toy . |
| 3,915,561 | 10/1975 | Toy . |
| 3,923,370 | 12/1975 | Mostrom . |
| 3,940,204 | 2/1976 | Withrington . |
| 4,082,432 | 4/1978 | Kirschner . |
| 4,257,677 | 3/1981 | Anderson . |
| 4,309,070 | 1/1982 | St. Leger Searle . |
| 4,360,836 | 11/1982 | Breck et al. .......................... 359/857 |
| 4,383,740 | 5/1983 | Bordovsky . |
| 4,400,723 | 8/1983 | Fanizza et al. . |
| 4,451,895 | 5/1984 | Sliwkowski . |
| 4,490,745 | 12/1984 | Erickson et al. . |
| 4,506,295 | 3/1985 | Young et al. . |
| 4,568,080 | 2/1986 | Yokoi . |
| 4,569,572 | 2/1986 | Kupich . |
| 4,589,659 | 5/1986 | Yokoi et al. . |
| 4,600,271 | 7/1986 | Boyer et al. . |
| 4,605,291 | 8/1986 | Jolly . |
| 4,647,142 | 3/1987 | Boot . |
| 4,669,810 | 6/1987 | Wood . |
| 4,717,248 | 1/1988 | Larussa . |
| 4,759,621 | 7/1988 | Hawkins . |
| 4,880,300 | 11/1989 | Payner et al. ........................ 359/857 |
| 4,930,884 | 6/1990 | Tichenor et al. .................... 359/857 |
| 5,130,856 | 7/1992 | Tichenor et al. .................... 359/857 |

FOREIGN PATENT DOCUMENTS

| | | | |
|---|---|---|---|
| 720633 | 11/1965 | Canada ................................. 359/858 |
| 10993042 | 11/1954 | France . |
| 583761 | 10/1958 | Italy .................................... 359/857 |

Primary Examiner—Bruce Y. Arnold
Assistant Examiner—R. D. Shafer
Attorney, Agent, or Firm—Antonelli, Terry, Stout & Kraus

[57] ABSTRACT

A vision saver for use with a computer monitor relieves eye strain, reduces focusing problems, minimizes eye convergence, reduces the number of eye and head movements by an operator using a computer keyboard with the computer monitor, and reduces glare. The vision saver comprises first and second reflecting surfaces and a supporting structure for supporting the reflecting surfaces in spaced relation in front of the computer monitor such that the first reflecting surface faces the screen of the monitor and the second reflecting surface, and the second reflecting surface faces the first reflecting surface and outwardly from the screen of the monitor whereby a person can visually observe the screen of the computer monitor by viewing the second reflecting surface which can advantageously be positioned closer to the computer keyboard than the screen of the monitor. The first reflecting surface is preferably made concave for magnifying the image on the screen and worm gear drives can be provided for fine tuning of the positions of the reflecting surfaces with respect to the supporting structure for accommodation of different size monitors and ease of use and focusing the image closer or farther away.

22 Claims, 8 Drawing Sheets

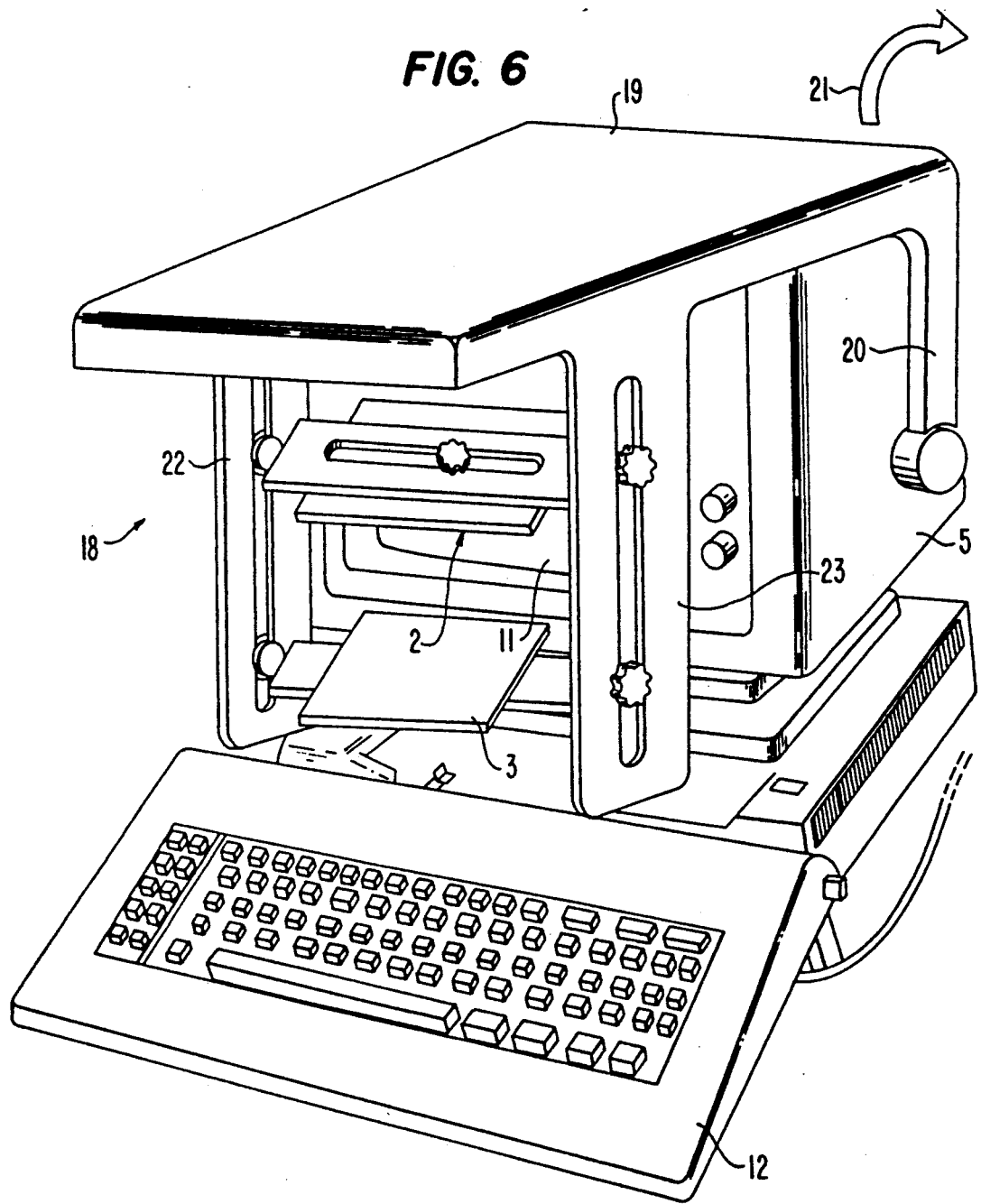

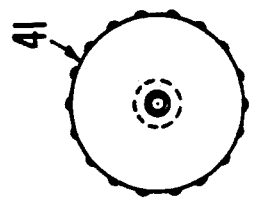
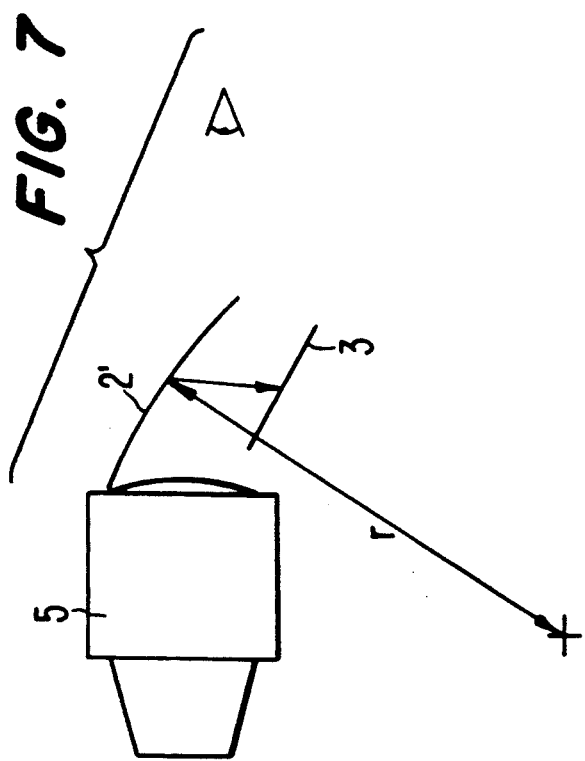
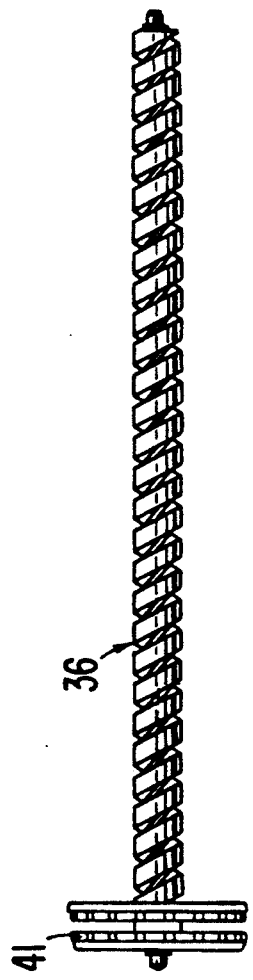

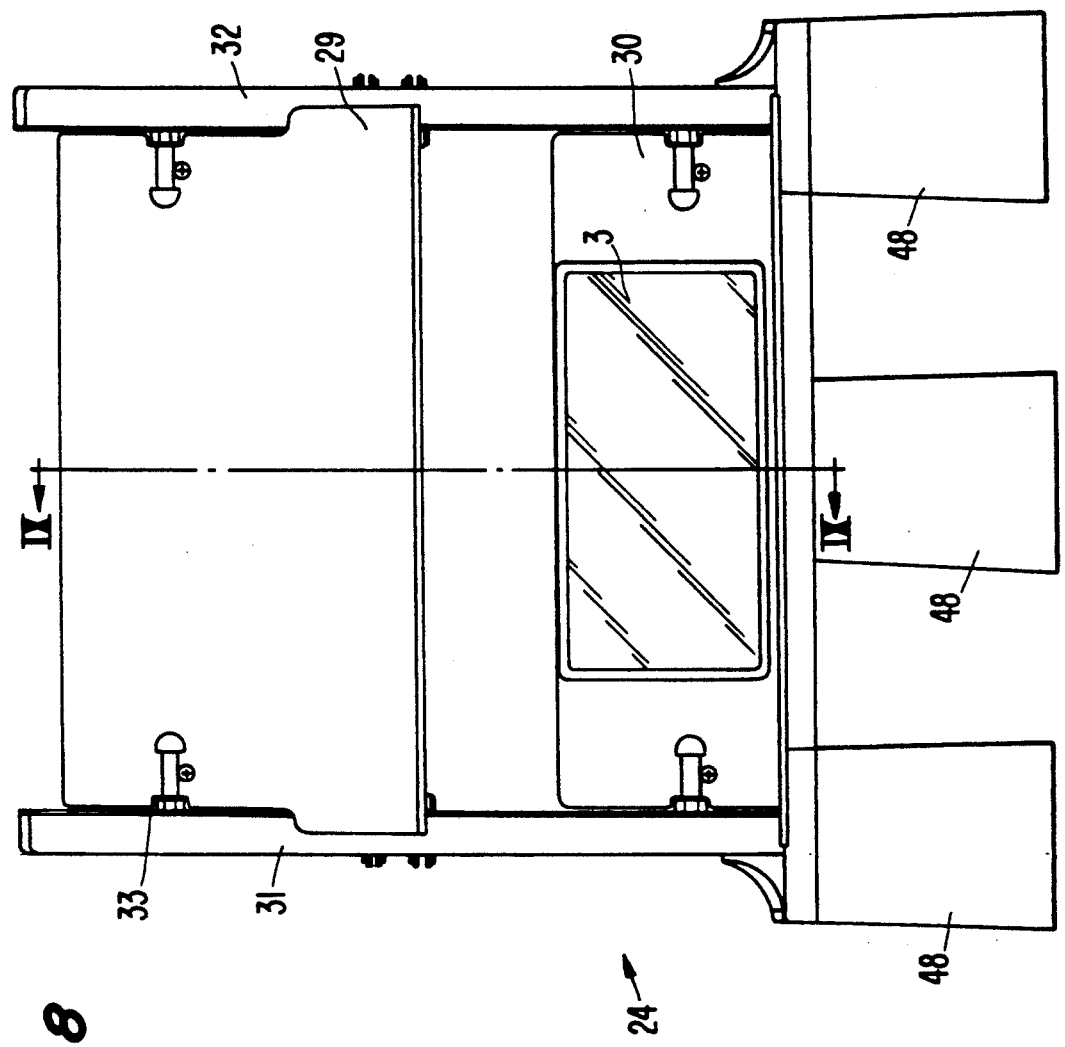

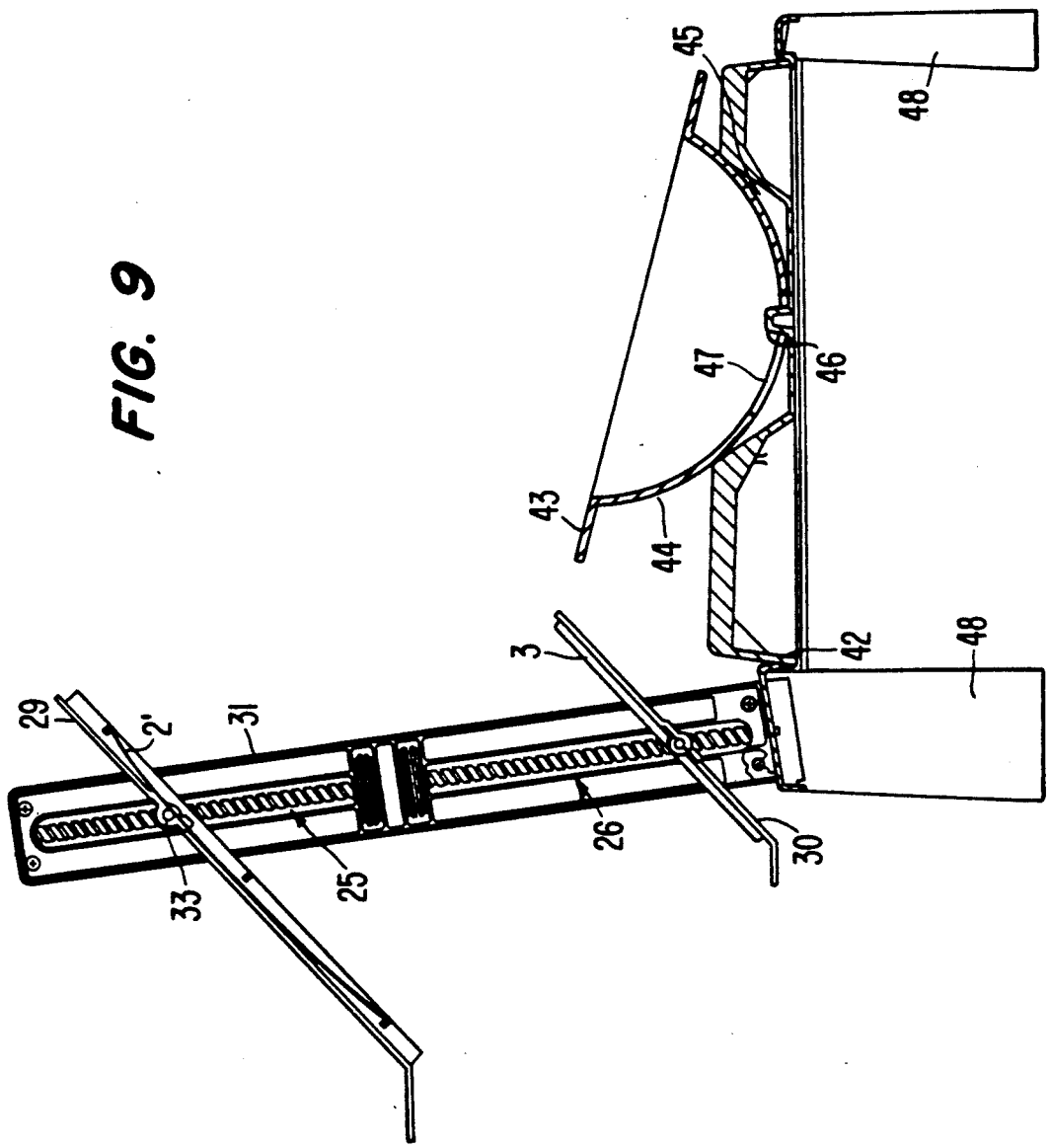

VISION SAVER FOR COMPUTER MONITOR

RELATED APPLICATION

This application is a continuation-in-part our copending application Ser. No 07/435,047 filed Nov. 13, 1989, now abandoned which in turn is a continuation of application Ser. No. 07/191,079 filed May 6, 1988, now U.S. Pat. No. 4,880,300 issued Nov. 14, 1989.

BACKGROUND AND SUMMARY OF THE INVENTION

The present invention is directed to a vision saver and method of using the same with a computer monitor for relieving neck, shoulder and eye strain.

There are frequent complaints from people who view computer monitors for prolonged periods. Because of the fact that the computer monitor is normally at approximately 16 to 20 inches from the person seated before a desk or a table supporting the computer monitor, eye strain, frequent eye and head movements, focusing problems, and other similar problems tend to occur. This is primarily related to the fact that the monitor is relatively close to the viewer, there is glare from the screen and the keyboard is at lower level than the monitor.

An object of the present invention is to provide a vision saver which eliminates the aforementioned problems in viewing computer monitors. More particularly, an object of the present invention is to provide a vision saver which relieves neck, shoulder and eye strain by minimizing focusing problems, reducing the mount of eye convergence required, reducing glare and limiting the number of eye and head movements.

Another object is to provide an improved vision saver which enables the user to easily fine tune the positions and viewing angles of reflecting surfaces of the device for optimum viewing comfort and which enables the viewer to focus the image in the second mirror closer or farther away and to conveniently adjust the image to plumb if the screen is tilted.

An additional object of the invention is to provide an improved vision saver which magnifies the image on the computer monitor to ease eye strain for the viewer with normal vision and to make it possible for visually handicapped persons having low vision to safely view the computer monitor, without causing a dizzying effect or other discomfort when viewing.

These and other objects are attained by the vision saver for a computer monitor according to the present invention. The vision saver comprises first and second reflecting surfaces and support means for supporting the first and second reflecting surfaces in spaced relation in front of the computer monitor such that the first reflecting surface faces the screen of the monitor and the second reflecting surface, and the second reflecting surface faces the first reflecting surface and outwardly from the screen of the monitor whereby a person can visually observe the screen of the computer monitor by viewing the second reflecting surface. Applicants have found that this vision saver causes the image or the screen of the computer monitor to appear to be farther away when viewed in the second reflecting surface as compared with direct viewing of the image on the monitor screen.

At the same time, according to a further feature of the invention, the vision saver puts the image on the screen of a computer monitor in a more reasonable position for the viewer to view so that when the viewer is wearing bifocal glasses, for example, he/she may read the image with the distance lenses on the glasses and not necessarily the close up or reading lenses. According to a preferred embodiment of the invention, the first reflecting surface is supported in an elevated position with respect to the second reflecting surface and the second reflecting surface is supported in a position closer to a keyboard of a computer than the screen of the monitor thereby reducing or eliminating head movement when visually jumping back and forth between the image on the screen of the monitor and the keyboard.

It is known from U.S. Pat. No. 4,930,884 to employ a magnifying lens between first and second reflecting surfaces of an easy viewing device for magnifying the image on the computer monitor as seen by the viewer in the second reflecting surface. This known arrangement is disadvantageous in that it requires the use of another optical component, e.g. the magnifying lens, in the device thereby increasing the complexity and cost of the device.

Another device disclosed in U.S. Pat. No. 4,930,884 employs a second, lower mirror, the mirror directly viewed by the user, having a concave reflective surface so that the image reflected by the second mirror toward the eyes of the viewer will be magnified. Applicants have found this arrangement providing magnification to be unsatisfactory because any head movement by the user can cause parallax problems, e.g. a dizzying or nausea effect which is quite uncomfortable after a very short viewing time.

The present invention overcomes these drawbacks with the aforementioned device of U.S. Pat. No. 4,930,884 by providing as a further feature of the improved vision saver that the first reflecting surface which faces the screen of the computer monitor, is made concave to provide for magnification of an image on the screen of the computer when the viewer views the second reflecting surface. The second reflecting surface is preferably planar. Applicants have found that this avoids the dizzying effect with head movement which occurs when the magnification is accomplished by forming the second reflective surface concave, and the improved vision saver of the invention does not require the use of an additional magnifying lens between the first and second reflecting surfaces.

The radius of the curvature of the concave first reflecting surface is within the range of from 25 to 200 inches and for general use, preferably about 85 inches, which gives a magnification of about one and one-half power depending on the spacing between the first and second reflecting surfaces. Usually handicapped individuals whose vision is between 20/50 and 20/100 are helped by decreasing the radius of curvature to, for example, 50 inches which gives between two and one-half and three power magnification. These handicapped individuals would normally have to get very close to the monitor screen to see it and thereby become potentially endangered because of the extra low frequency magnetic radiation (ELF's). With the improved vision saver of the invention they can safely stay at a normal distance away from the monitor.

The first and second reflecting surfaces are primary reflecting surfaces or mirrored surfaces according to the invention. The support means includes means for adjusting the positions of the reflecting surfaces with respect to the support means and also means for adjusting the facing directions of the reflecting surfaces.

In one form of the invention, the support means is free standing and includes a platform for supporting the computer monitor. Means are provided for adjusting the height of the platform with respect to the remainder of the support means and means are provided for individually adjusting the height and the facing direction of each of the first and second reflecting surfaces with respect to the support means so that the vision saver can be quickly adapted for use with different sizes of monitors. The remainder of the support means includes a pair of uprights spaced from one another and supporting the first and second reflecting surfaces therebetween at respective ends of the reflecting surfaces.

In a second form of the invention, the support means includes means for connecting the support means to a computer monitor. In this form of the invention, the support means is provided with means pivoting the support means and the reflecting surfaces supported thereby with respect to the computer monitor, so that the vision saver can be pivoted into a position for use by the viewer or pivoted out of such position when it is not desired to use the device.

According to another feature of the invention, the support means and an edge of the first reflecting surface supported thereby are located in substantially the same plane so that they can be positioned immediately adjacent the front of the monitor. This eliminates most overhead light and various distractions which might be noted while viewing the monitor. The first reflecting surface is also preferably positioned to visually block direct view of the monitor screen by the viewer to eliminate distraction when viewing the screen in the second reflecting surface.

The method of the invention of relieving eye strain while visually observing a computer monitor comprises the steps of supporting first and second reflecting surfaces in spaced relation in front of a computer monitor such that the first reflecting surface faces the screen of a monitor and the second reflecting surface, and the second reflecting surface faces the first reflecting surface and outwardly from the screen of the monitor, and viewing the second reflecting surface to observe the screen of the monitor. Preferably, the first reflecting surface is supported in an elevated position with respect to the second reflecting surface and the second reflecting surface is supported in a position closer to a keyboard of the computer than the screen of the monitor. Because the image on the screen of the monitor appears to be farther away when viewed in the second reflecting surface as compared with direct viewing of the screen of the monitor, and because the image is positioned for the viewer to read the screen image in the second reflecting surface and particularly where the image is magnified, a person can use single vision lenses or the distance part of his bifocals, not the reading area. By viewing this image of the monitor, necessary eye convergence is reduced and focusing problems are minimized. This, taken with the reduction or elimination of head movement and eye movement, results in relief of eye and neck and shoulder strain which frequently occurs when viewing a computer monitor in a conventional manner.

Another feature of a preferred form of the invention involves the use of support means which includes worm gear means for adjusting the positions of the first and second reflecting surfaces with respect to the support means. The worm gear means advantageously enable the user to fine tune the positions and viewing angles of the reflecting surfaces. The image of the screen can be focused closer or farther away by moving the reflecting surfaces closer together or farther apart and the magnification is also varied by the same means. Where a worm gear is provided at each of two opposite sides of the surfaces the user can conveniently adjust the image to plumb if the screen is tilted.

These and other objects, features and advantages of the invention will become more apparent from the following description when taken in connection with the accompanying drawings which show, for purposes of illustration only, two embodiments in accordance with the present invention.

BRIEF DESCRIPTION OF THE DRAWINGS

FIG. 6 is a perspective view of another embodiment of the invention wherein the vision saver is pivotally mounted on the computer monitor rather than being free standing as in the embodiment of FIGS. 1-5.

FIG. 7 is a schematic side view of a computer monitor and first and second reflecting surfaces of a vision saver of the invention wherein the first reflecting surface is formed concave with a radius of curvature r for magnification of the monitor screen image seen at the second reflecting surface;

FIG. 8 is a front view of a vision saver according to the third embodiment of the invention;

FIG. 9 is a side view, partially in cross section of the vision saver of FIG. 8 taken along the line IX—IX in FIG. 8;

FIG. 12 is a side view of the lower track rod with actuator knob of one of the worm gear drives shown in FIGS. 9-11; and FIG. 13 is an end view of the left end of the rod with actuator knob of FIG. 12.

DETAILED DESCRIPTION OF THE DISCLOSED EMBODIMENTS

Figure 1:
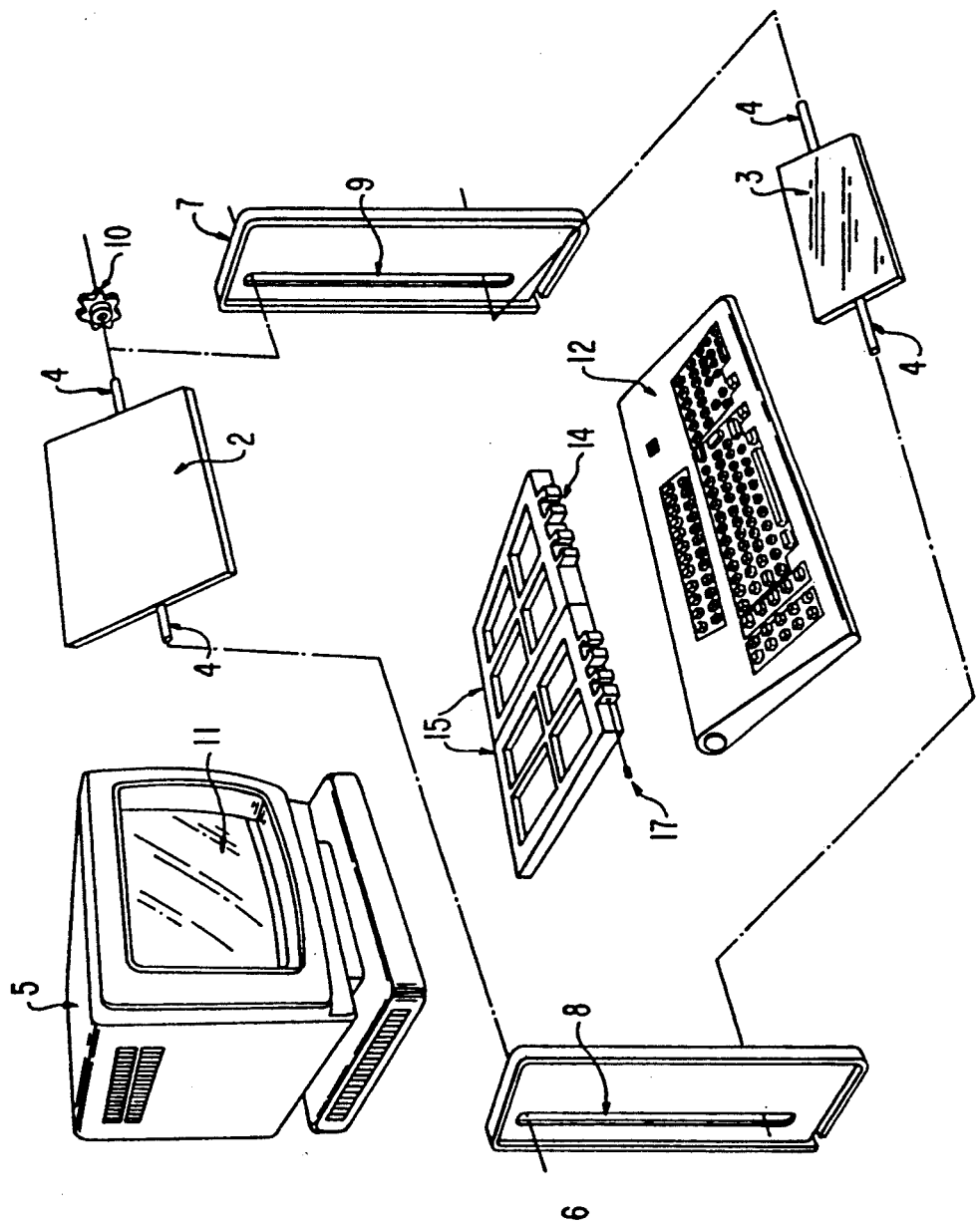
FIG. 1 is a perspective view of a disassembled vision saver of the present invention in proximity to a computer with a computer monitor and keyboard.

Referring now to the drawings, a vision saver 1 according to a first embodiment of the invention is shown in FIGS. 1-5. The vision saver 1 comprises first and second reflecting surfaces 2 and 3, respectively. The reflecting surfaces 2 and 3 are primary reflecting surfaces, particularly they are front surfaced mirrors in the illustrated embodiment. These reflecting surfaces may vary as to the amount of reflection and absorption of light depending on the material or the coating used. The reflectivity of the front surfaced mirrors in the illustrated embodiments is 55%. The reflecting surfaces 2 and 3 are each formed with threaded studs 4 on two opposite sides for support.

The reflecting surfaces 2 and 3 are supported in a position of use in front of a computer monitor 5 by means of a pair of upright members 6 and 7. In particular, the studs 4 of the reflecting surfaces 2 and 3 extend through elongated channels 8 and 9 of the upright members. Threaded knobs 10 received by the threaded studs 4 releasably clamp the reflecting surfaces to the upright members 6 and 7 in the desired positions.

Figure 2:
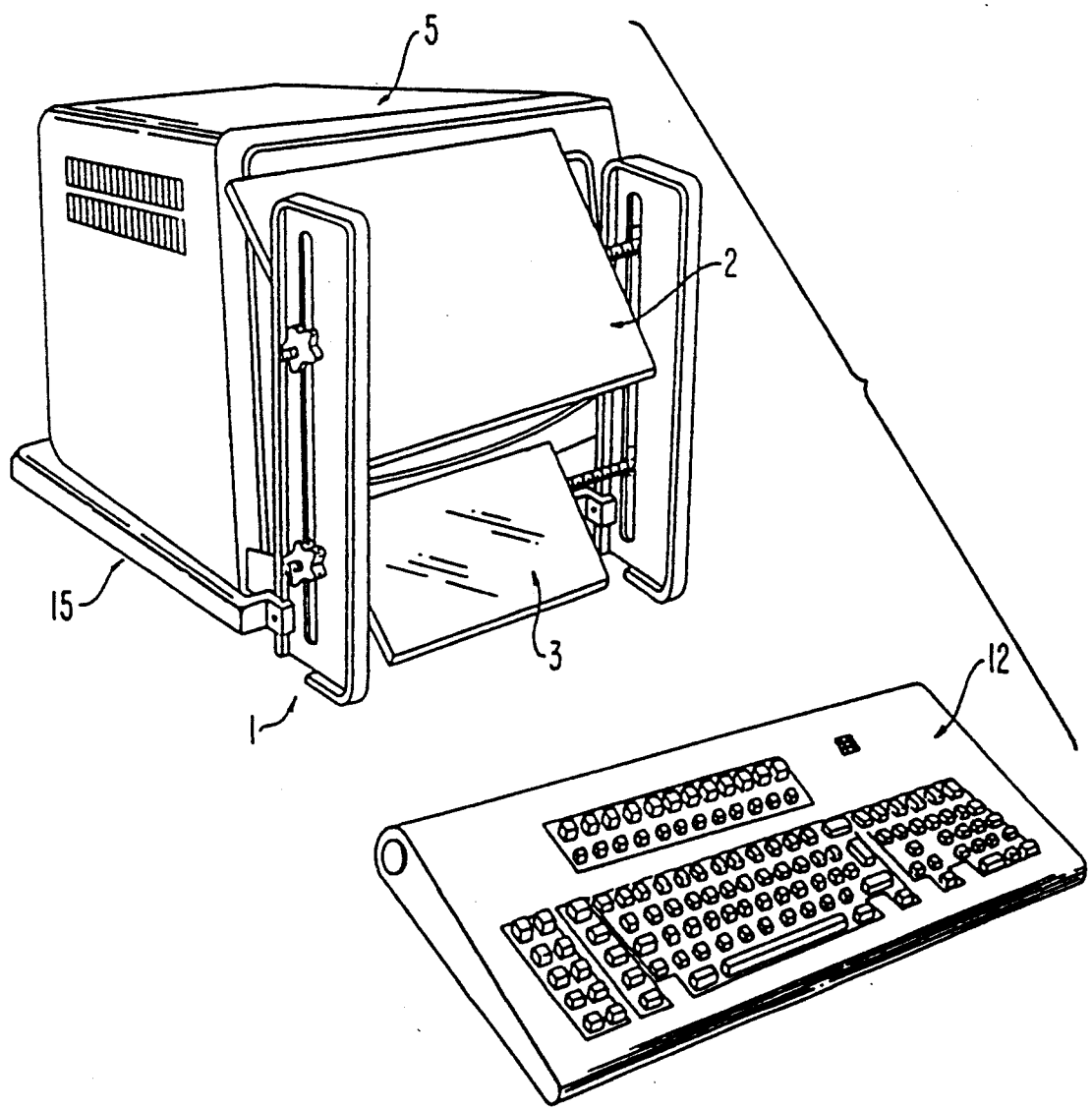
FIG. 2 is a view similar to FIG. 1 but with the vision saver in assembled position in front of the computer monitor for use by a computer operator.
Figure 3:
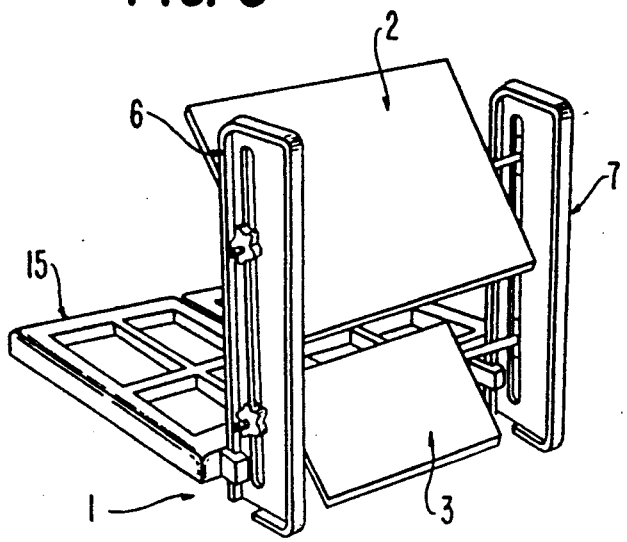
FIG. 3 is a perspective view of the assembled vision saver of FIGS. 1 and 2 in the absence of a computer monitor and keyboard.
Figure 4:
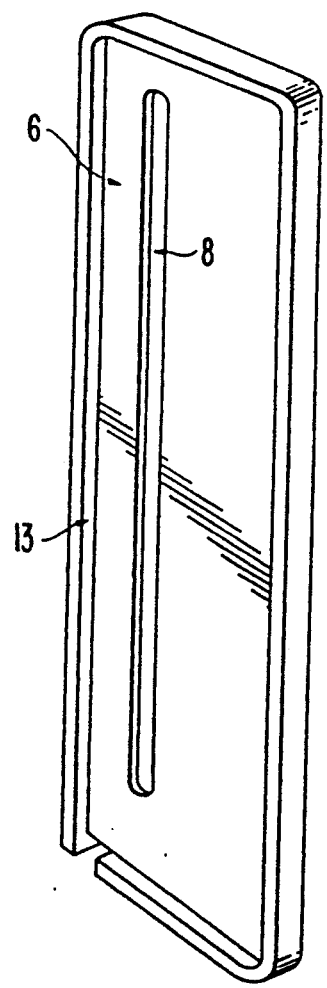
FIG. 4 is an enlarged view, partially cut away of one of the two uprights of the vision saver.
Figure 5:
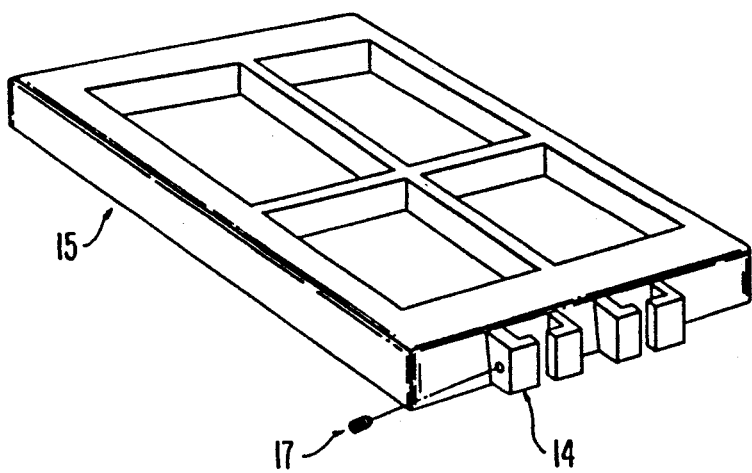
FIG. 5 is an enlarged view of a portion of the monitor platform and a mounting bracket to be attached thereto for receiving a flange of an upright member of the vision saver.
Figure 10:
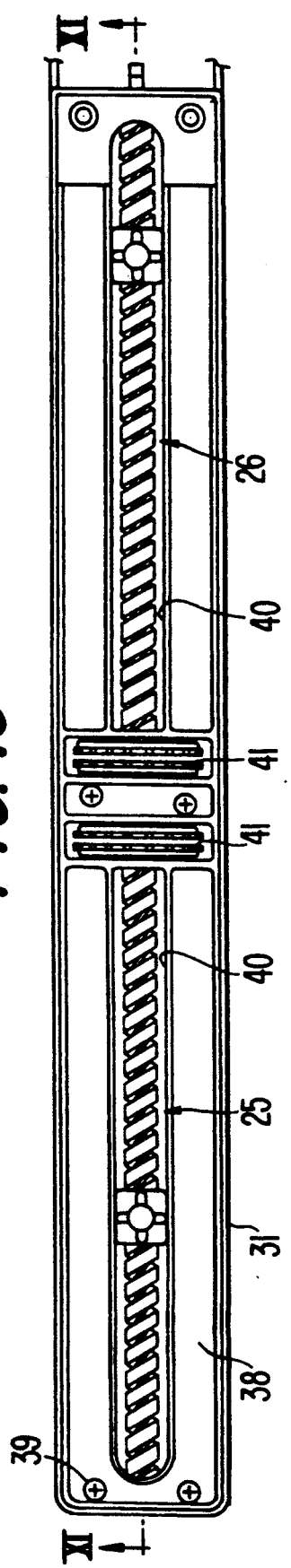
FIG. 10 is an enlarged view of the worm gear arrangement in one of the uprights of the vision saver of FIGS. 8 and 9.
Figure 11:
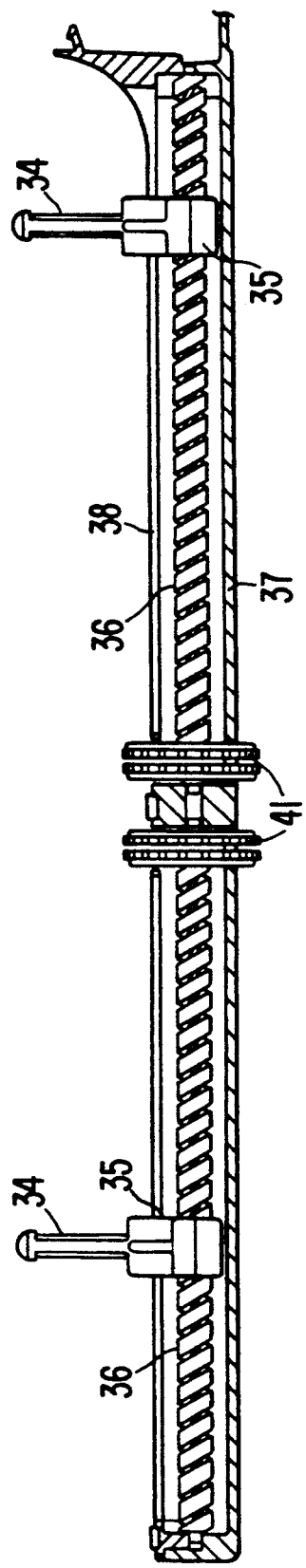
FIG. 11 is a sectional view of the upright of FIG. 10 taken along the line XI—XI and illustrating the worm gear drives for one end of each of the first and second reflecting surfaces.

As shown in FIG. 2, the first and second reflecting surfaces are supported in the upright members 6 and 7 in spaced relation in front of the computer monitor 5 such that the first reflecting surface 2 faces the screen 11 of the computer monitor and the second reflecting surface 3, while the second reflecting surface faces the first reflecting surface and outwardly from the screen 11 of the monitor. This permits a person sitting in front of the keyboard 12 of the computer to visually observe the image, letters or other characters, on the screen 11 of the computer monitor 5 by viewing the second reflecting surface 3. The upright members 6 and 7 and also the inner edge of the first reflecting surface 2 are positioned in substantially the same plane closely adjacent the front of the monitor blocking any direct view of the monitor that would interfere with the second reflecting surface when viewed.

The arrangement of the first and second reflecting surfaces 2 and 3 in front of the computer monitor causes the screen image seen in the second reflecting surface 3 to appear to be farther away than if viewed directly without the vision saver of the invention. The vision saver puts the image in a more reasonable position for the viewer to view and may magnify it so that the viewer, if wearing bifocal glasses, can read the image with the distance lenses on his/her glasses and not the close up or reading lenses. Whether or not the viewer wears glasses, it has been found that the invention relieves eye strain and minimizes focusing problems for people of all ages because the image appears to be farther away when viewing the screen image at the second reflecting surface 3. The number and magnitude of eye and head movements required by the computer operator is also reduced as is eye convergence, with the vision saver of the invention.

The width of the first reflecting surface 2 is wider than the second reflecting surface 3 and may be as wide as the screen 11 of the computer monitor to facilitate viewing of the entire screen by the viewer. The second reflecting surface is smaller than the first reflecting surface so that the reflection of the monitor screen seen therein substantially fills the surface to eliminate distractions. For example, the first reflecting surface can be 9"×10" and the second 6"×8" when used with a 12" monitor screen.

Front surfaced mirrors for the first and second reflecting surfaces 2 and 3 are available commercially in varying degrees of reflectivity but in no case reflect 100% of the incoming light. Consequently, after reflections by the front surfaced mirrors 2 and 3, the brightness or intensity of the monitor screen as seen in the second reflecting surface is reduced as compared with the brightness or intensity of the monitor screen when viewed directly. Thus, any unwanted glare on the monitor screen, when viewed in the second reflecting surface, is reduced. The brightness of the monitor screen image as seen in the second reflecting surface is also reduced but this can be compensated for by adjustment of the brightness and/or contrast controls of the monitor to a level which is comfortable for the viewer.

The upright members 6 and 7 supporting the reflecting surfaces may be formed from molded plastic, for example. Each upright member is formed with a flange 13 which extends about the entire periphery of the upright member except for a portion at the lower rear corner of the upright members where there is no flange. The absence of a flange 13 at the lower rear corners of the upright members permits the flanged edges of the upright members to be slidably received in brackets 14 which integrally molded with a platform 15. Alternatively, the brackets could be formed separately and mounted on the platform with suitable fasteners.

The platform 15 serves a base for the upright members and is adapted to support the computer monitor 5 during use. A set screw 17 in each bracket 14 is provided for releasably clamping the upright member in the bracket whereby the entire assembly of upright members 6 and 7 and reflecting surfaces 2 an 3 carried thereby can be adjusted vertically with respect to the platform 15 and computer monitor 5 thereon. This facilitates adjustment of the reflecting surfaces with respect to the screen 11 of the monitor for proper viewing of the screen in the second reflecting surface 3. The brackets 14 and platform 15 can also be formed from plastic as by molding. The threaded knobs 10 on the studs 4 of each mirror can also be loosened to pivot and vertically adjust the individual reflecting surfaces with respect to the upright members and an adjacent monitor screen, as necessary.

Another feature of the vision saver 1 is that the side of the first reflecting surface 2 located away from the computer monitor overlaps the corresponding side of the second reflecting surface 3 located beneath it. This provides the significant advantage of avoiding unwanted reflections from fluorescent or other ceiling lights, for example. This overlap results from the vertical or upright orientation of the upright members 6 and 7 and vertical channels 8 therein and the larger width of the upper reflecting surface 2 as compared with that of the lower reflecting surface 3.

While the vision saver 1 illustrated in FIGS. 1-5 is free standing, according to a second embodiment of the invention illustrated in FIG. 6 of the drawings, the vision saver 18 is connected to and supported on the computer monitor 5 by way of a cover member 19 and a pair of downwardly depending arms 20 at the rear thereof. The lower ends of the arms 20 are each pivotably connected to the sides of the computer monitor with a suitable fastener to allow the vision saver 18 to be pivoted from the position of use shown in FIG. 6 upwardly as shown by the arrow 21 and out from in front of the screen 11 of the monitor. The upright members 22 and 23 of the vision saver 18 are formed integrally at the upper end thereof With the cover member 19 and arms 20 and 21. The cover members and upright members prevent light from coming into the vicinity of the monitor screen and distracting the viewer. An opaque cloth could be used to cover the juncture between the upper mirror and the monitor in the embodiment of FIGS. 1-5 for the same purpose, if necessary.

The reflecting surfaces 2 and 3 in the embodiments of FIGS. 1-6 are plane reflecting surfaces. According to another feature of the invention, it has been found advantageous to magnify the image on the computer monitor screen to ease eye strain for the viewer with normal vision and to make it possible for visually handicapped persons having low vision to safely view the computer monitor. For this purpose, the first reflecting surface, 2' in FIG. 7, which faces the screen of the computer monitor and the second reflecting surface 3, is made concave with a radius of curvature r to provide for magnification of an image on the screen of the computer monitor when the viewer views the second reflecting surface 3. Applicants have found that this arrangement avoids parallax problems, e.g. the dizzying or nausea effect which can occur with head movement when magnification is accomplished by forming the second reflective surface 3 concave as suggested in U.S. Pat. No. 4,930,884.

The radius of curvature r of the concave first reflecting surface 2' according to the invention is within the range of from 25 to 200 inches and for general use, preferably about 85 inches, which gives a magnification of about one and one-half power depending on the spacing between the first and second reflecting surfaces. Visually handicapped individuals whose vision is between 20/50 and 20/100 are helped by decreasing the radius of curvature to, for example, 50 inches which gives between 2½ and 3 power magnification. Individuals with this low vision would normally have to get very close to the monitor screen to see it and thereby become potentially endangered because of the extra low frequency magnetic radiation (ELF's). They can safely stay at a normal distance away from the monitor using the improved vision saver of the invention.

A vision saver 24 according to a third embodiment of the invention, as shown in FIGS. 8-13 comprises worm gear drives 25 and 26 that enable the user to fine tune panels 29 and 30 containing the first and second reflecting surfaces 2' and 3, respectively, to a distance position as well as a viewing angle that he/she likes. The image of the screen can be focused closer or further away by moving the reflecting surfaces closer together or farther apart and the magnification is also varied by the same means. The worm gear drives also enable the user to adjust the image as viewed in the second reflecting surface 3 to plumb if the screen of the computer monitor is tilted, by adjusting the worm gear drives at one end of the reflecting surfaces.

The vision saver 24 further comprises a pair of uprights 31 and 32 spaced from one another and supporting the panels 29 and 30 and the first and second reflecting surfaces thereon between the uprights at respective ends of the reflecting surfaces. Specifically, each of the panels 29 and 30, which can be formed of molded plastic, for example, is formed with apertures 33 at opposite ends thereof. The apertures 33 receive respective projections 34 on traverse blocks 35 associated with the worm gear drives. The panels can be rotated with resistance about the mounting projections 34 which serve as pivots for changing the facing directions of the first and second reflecting surfaces on the panels.

The traverse blocks 35 are threadedly mounted on respective threaded track rods 36 of the respective worm gear drives 25-28. Each upright 31 and 32 is provided with an upper worm gear drive 25 and a lower worm gear drive 26, 28 for movably supporting the ends of the panels 29 and 30 and the reflecting surfaces thereon. The threaded rods 36 are rotatably supported within the guides at their ends in suitable apertures defined between a base 37 and a bezel 38 removably secured to the base by means of screw fasteners 39. The traverse blocks 35 with projections 34 extend outwardly from the guides for supporting the panels through elongated slots 40 in the bezels 38. An annular knob 41 is provided adjacent one end of each of the track rods 36 for manually rotating the track rods 36 which, in turn, causes axial translation of the traverse blocks 35 upwardly and downwardly along the uprights depending upon the direction of rotation of the knobs.

The lower end of each upright 31 and 32 is formed integrally with, as by molding, or otherwise connected to a base 42 of the vision saver 24. The base 42 constitutes a platform for supporting a computer monitor as well as supporting the first and second reflecting surfaces 2' and 3 and their associated panels 29 and 30 in position in front of the screen of the computer monitor. As shown in FIG. 9, the base 42 includes a mounting plate 43 formed with a semi-spherical base 44. The semi-spherical base 44 rests in an annular opening 45 of the base with an annular projection 46 thereon projecting through an elongated slot 47 in the semi-spherical base. This permits rotational as well as tilting adjustment of the monitor screen with respect to the vision saver when the computer monitor rests on mounting plate 43. As a result of the adjustability provided by the individual worm gear drives, taken with the adjustable mounting plate 43, different size monitors can be supported on the vision saver 24 and viewed by way of the first and second reflecting surfaces thereof through appropriate adjustments of the reflecting surface positions and the monitor position.

The base 42 of the vision saver 24 in FIGS. 8-13 is provided with short legs 48 for elevating the monitor above the work surface, e.g. a table. However, the legs could be made larger or eliminated such that the vision saver can be used with or without a riser (CPU or dummy CPU) depending on the position the individual prefers to hold his head when working. A handicapped individual who has difficulty lifting his head would prefer that the vision saver be at desk level whereas a person who likes the image to be at a more normal viewing level would likely prefer the image elevated. Both the concave and plane reflecting surfaces 2' and 3, respectively, are preferably primary reflecting surfaces in order to eliminate ghost images.

The radius of curvature r of first reflecting surface 2' is from 25 inches to 200 inches with the optimum for general use being 85 inches (about one and one-half power). Visually handicapped individuals whose vision is between 20/50 and 20/100 are helped by decreasing the radius of curvature to 50 inches which gives between 2¼ and 3 power magnification. This offers the important advantage to the low vision user, from a safety standpoint, of being able to view the image on the screen from a relatively safe position as opposed to getting up very close to the monitor to see the image where there would be the potential danger of exposure to the extra low frequency magnetic radiation form the monitor. The reflecting surfaces are attached to their panel by adhesive bonding or with the use of a mounting frame about the mirror edges which is mechanically fastened to the panel.

While we have shown and described several embodiments in accordance with the present invention, it is understood that the same is not limited thereto, but is susceptible to numerous changes and modifications as known to those skilled in the art. Therefore, we do not wish to be limited to the details shown and described herein but intend to cover all such changes and modifications as are encompassed by the scope of the appended claims.

We claim:

1. A vision saver for use with a computer monitor comprising first and second reflecting surfaces and support means for supporting said first and second reflecting surfaces in spaced relation in front of a computer monitor such that said first reflecting surface is relatively higher than said second reflecting surface and faces the screen of said monitor and the second reflecting surface, and said second reflecting surface faces said first reflecting surface and outwardly from the screen of said monitor whereby a person can visually observe the screen of the computer monitor by viewing the second reflecting surface, wherein said first reflecting surface is a concave reflecting surface to provide for magnification of an image on the screen of the computer monitor when viewing the second reflecting surface, and wherein the radius of curvature of the concave first reflecting surface is between 25 and 200 inches.

2. The vision saver according to claim 1, wherein the second reflecting surface is a plane reflecting surface.

3. The vision saver according to claim 1, wherein said support means includes means for adjusting the facing directions of said first and second reflecting surfaces.

4. The vision saver according to claim 1, in said support means is freestanding.

5. The vision saver according to claim 1, wherein said support means includes a platform for supporting the computer monitor.

6. The vision saver according to claim 5, wherein means are provided for adjusting the height of said platform with respect to the remainder of said support means and the first and second reflecting surfaces supported thereby.

7. The vision saver according to claim 1, wherein said support means includes means for connecting said support means to the computer monitor.

8. The vision saver according to claim 1, wherein said support means and an edge of said first reflecting surface supported thereby are located in essentially the same plane for positioning immediately adjacent the front of the monitor to prevent any direct view of the monitor.

9. The vision saver according to claim 1, further comprising cover means for covering the juncture between the monitor and the first reflecting surface to prevent extraneous light from distracting a person viewing the monitor screen in the second reflecting surface.

10. The vision saver according to claim 9, wherein said cover means is formed integrally with said support means.

11. The vision saver according to claim 1, wherein said second reflecting surface is smaller than said first reflecting surface so that the monitor screen seen in the second reflecting surface substantially fills the second reflecting surface to eliminate disturbances from the field of view.

12. The vision saver according to claim 1, wherein the first reflecting surface has a width which is at least equal to the width of said monitor screen.

13. The vision saver according to claim 1, wherein said support means supports said first reflecting surface above said second reflecting surface with the side of said first reflecting surface to be located away from the computer monitor overlapping the corresponding side of the second reflecting surface located beneath it.

14. A vision saver for use with a computer monitor comprising first and second reflecting surfaces and support means for supporting said first and second reflecting surfaces in spaced relation in front of a computer monitor such that said first reflecting surface is relatively higher than said second reflecting surface and faces the screen of said monitor and the second reflecting surface, and said second reflecting surface faces said first reflecting surface and outwardly from the screen of said monitor whereby a person can visually observe the screen of the computer monitor by viewing the second reflecting surface, wherein said first reflecting surface is a concave reflecting surface to provide for magnification of an image on the screen of the computer monitor when viewing the second reflecting surface, and wherein said support means includes means for pivoting the support means and the reflecting surfaces supported thereby with respect to said computer monitor.

15. A vision saver for use with a computer monitor comprising first and second reflecting surfaces and support means for supporting said first and second reflecting surfaces in spaced relation in front of a computer monitor such that said first reflecting surface is relatively higher than said second reflecting surface and faces the screen of said monitor and the second reflecting surface, and said second reflecting surface faces said first reflecting surface and outwardly from the screen of said monitor whereby a person can visually observe the screen of the computer monitor by viewing the second reflecting surface, wherein said first reflecting surface is a concave reflecting surface to provide for magnification of an image on the screen of the computer monitor when viewing the second reflecting surface, and wherein said support means includes worm gear means for finely translating the position of the first and second reflecting surfaces with respect to said support means by actuation of said worm gear means.

16. The vision saver according to claim 15, wherein said support means includes a pair of uprights spaced from one another and supporting said first and second reflecting 17. A vision saver for use with a computer monitor comprising first and second reflecting surfaces and support means for supporting said first and second reflecting surfaces in spaced relation in front of a computer monitor such that said first reflecting surface faces the screen of said monitor and the second reflecting surface, and said second reflecting faces said first reflecting surface and outwardly from the screen of said monitor whereby a person can visually observe the screen of the computer monitor by viewing the second reflecting surface, wherein said support means includes worm gear means for finely translating the position of the first and second reflecting surfaces with respect to said support means by actuation of said worm gear means and wherein the support means includes a pair of uprights spaced from one another and supporting said first and second reflecting surfaces therebetween at respective ends of said reflecting surfaces, actuation of said worm gear means effecting axial translation of the reflecting surfaces upwardly or downwardly along the uprights to permit fine adjustment of the position of each end of the first and second reflecting surface with respect to its adjacent upright.

18. The vision saver according to claim 17 wherein said worm gear means permit precise translation of the first and second reflecting surfaces relative to one another by actuation of said worm gear means whereby an image of the monitor screen can be focused closer or farther away by moving the reflecting surfaces closer together or farther apart.

19. The vision saver according to claim 17, further comprising a platform for supporting the computer monitor, and said vision saver further including means for adjustably tilting said platform and the computer monitor supported therein with respect to said first and second reflecting surfaces.

20. The vision saver according to claim 19, further including means for adjustably rotating said platform and the computer monitor supported therein with respect to said first and second reflecting surfaces.

21. A vision saver for use with a computer monitor comprising first and second reflecting surfaces and support means for supporting said first and second reflecting surfaces in spaced relation in front of a computer monitor such that said first reflecting surface is relatively higher than said second reflecting surface and faces the screen of said monitor and the second reflecting surface, and said second reflecting surface faces said first reflecting surface and outwardly from the screen of said monitor whereby a person can visually observe the screen of the computer monitor by viewing the second reflecting surface, wherein said first reflecting surface is a concave reflecting surface to provide for magnification of an image on the screen of the computer monitor when viewing the second reflecting surface, and further comprising a platform for supporting the computer monitor and including means for adjustably tilting said platform and the computer monitor supported thereon with respect to said first and second reflecting surfaces.

22. The vision saver according to claim 21, further including means for adjustably rotating said platform and the computer monitor supported thereon with respect to said first and second reflecting surfaces.

* * * * *